2 Sheets—Sheet 1.
J. G. WOLF.
Apparatus for Refrigerating and Making Ice.
No. 213,487. Patented Mar. 18, 1879.
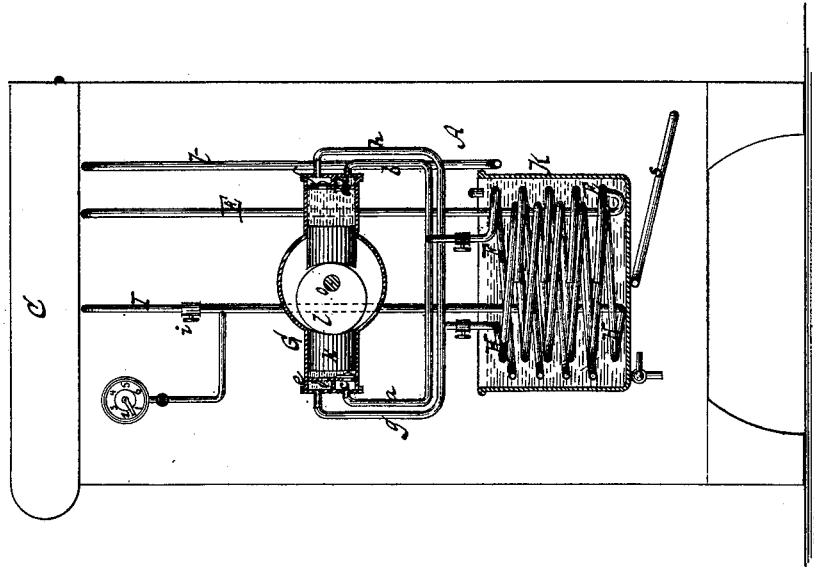
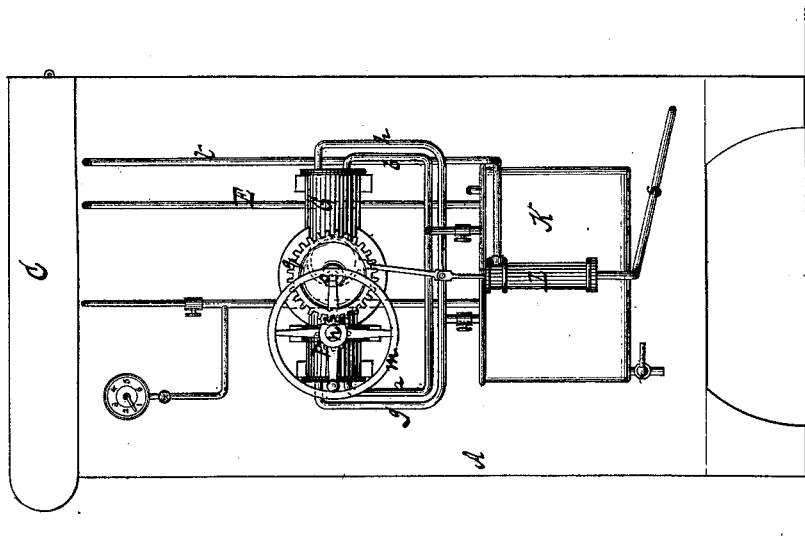
Witnesses.
Otto Hufeland.
W. C. Hauff.
Inventor.
John George Wolf.
by
Van Santvoord & Hauff
his attys.
N. PETERS, PHOTO-LITHOGRAPHER, WASHINGTON, D C.

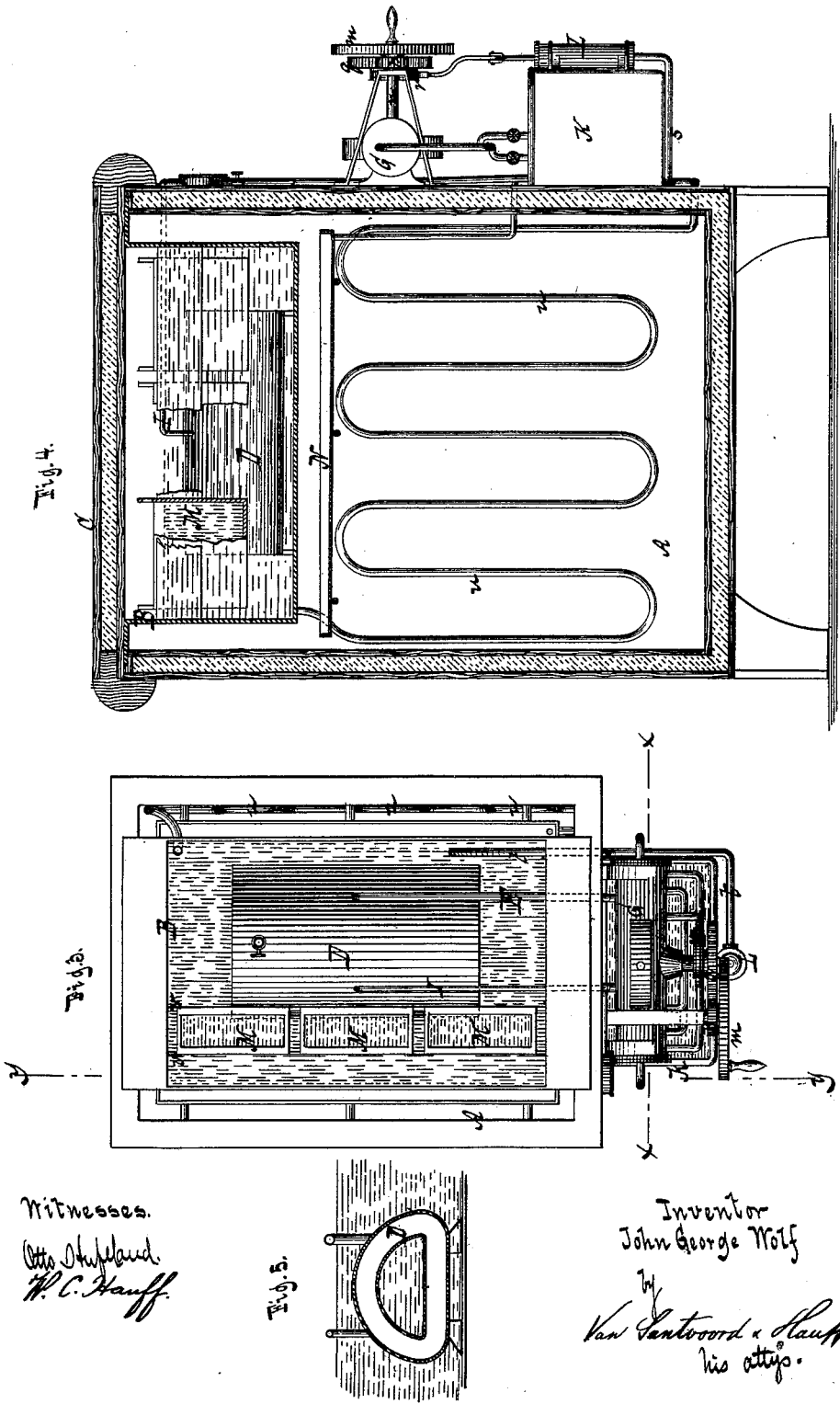

UNITED STATES PATENT OFFICE.

JOHN G. WOLF, OF NEW YORK, N. Y.

IMPROVEMENT IN APPARATUS FOR REFRIGERATING AND MAKING ICE.

Specification forming part of Letters Patent No. 213,487, dated March 18, 1879; application filed August 24, 1878.

*To all whom it may concern:*

Be it known that I, JOHN G. WOLF, of the city, county, and State of New York, have invented a new and useful Improvement in Apparatus for Producing Artificial Cold, which improvement is fully set forth in the following specification, reference being had to the accompanying drawings, in which—

Figure 1 represents an end view of my apparatus as applied to a room or provision-chamber. Fig. 2 is a vertical section in the plane $xx$, Fig. 3. Fig. 3 is a plan or top view, the cover of the apparatus having been removed to expose the parts below. Fig. 4 is a vertical section in the plane $yy$, Fig. 3. Fig. 5 is a transverse section of the vapor-expander detached.

Similar letters indicate corresponding parts.

This invention relates to an apparatus for producing artificial cold, which is adapted to the use of any volatile liquid, such as common ether, methylic ether, methyl chloride, ethyl chloride, cyanogen, sulphurous oxide, &c., the vapors of which can be condensed by a comparatively moderate pressure, and the rapid expansion or evaporation of which absorbs a considerable quantity of heat, and consequently produces a great decrease in the temperature of such bodies from which the heat is abstracted.

My invention consists in the combination, in an apparatus for producing artificial cold, of a tank filled with a non-congealable liquid, a suitable pump and connections for producing a circulation of the non-congealable liquid in said tank, a vapor-expander immersed in the liquid contained in said tank, a pump adapted to circulate a volatile liquid through the expander, a condenser filled with cold water, and two coils, one for the compression and the other for the expansion of the volatile liquid, both immersed in the water contained in said condenser and connected to the vapor-expander and to the pump, so that the heating effect of the compression-coil is counteracted by the cooling effect of the expansion-coil, and that the apparatus can be operated without the necessity of a constant change of the water in the condenser.

With the parts above enumerated is also combined a provision chamber or room in which the tank containing the non-congealable liquid is situated, so that by operating the pump from time to time the temperature in said chamber or room can be kept at a low degree. An additional pump serves to keep up a circulation of the non-congealable liquid in the tank and also in a coil situated in the chamber or room, so as to prevent the liquid in the tank from congealing and to increase the cooling effect in the chamber or room.

In the drawings, the letter A designates the provision-chamber of a refrigerator or a room the temperature of which is to be lowered. In the top of this chamber is situated a tank, B, made of sheet metal or other good conductor of heat, and filled with a non-congealable liquid, such as a mixture of water and glycerine. A tightly-fitting cover, C, serves to close the top of the chamber A, and a suitable door gives access to its interior.

In the tank B is placed the vapor-expander D, which is made annular in its cross-section, as shown in Fig. 5, and of such a form that when the tank is filled with liquid said expander is completely submerged, allowing said liquid to come in contact with its bottom, its sides, its ends, and also with its inner wall, thereby materially increasing its cooling-surface. In the example shown in the drawings the expander is D-shaped in its cross-section; but it can be made circular, oval, or in any other suitable form or shape.

The expander D connects, by a pipe, E, Fig. 2, with a coil, F, which I term the "expansion-coil," and which communicates, by branch pipes $a\ b$, with the suction-chambers $c\ d$ of a double-acting pump, G. The discharge-chambers $e\ f$ connect, by branch pipes $g\ h$, with a coil, H, termed the "compression-coil," the end of which rises up and connects, by a small tube, I, with the expander. A stop-cock, $i$, regulates the flow of the fluid from the coil H to the tube I. Both said coils F and H are situated in the condenser K, which is filled with cold water.

The plunger $k$ of the pump G receives its motion by an eccentric, $l$, which is situated in a slot formed in the body of the plunger, and to which a rotary motion is imparted by a hand-wheel, $m$, mounted on a shaft, $n$, which is geared together with the shaft $o$ of the eccentric by cog-wheels *p q*. If desired, however, a pulley may be mounted directly on the shaft *o* of the eccentric, so that motion can be imparted to the same by a belt from a line-shaft. In this case the hand-wheel, its shaft, and the cog-wheels *p q* are dispensed with.

On the shaft *o* of the eccentric *l* is mounted an eccentric-disk, *r*, which serves to transmit motion to the plunger of a pump, L, the suction-chamber of which connects, by a pipe, *s*, with a coil, *u*, which is situated in the chamber A, and opens into the bottom part of the tank B, while from the discharge-chamber of said pump a pipe, *t*, extends into the upper part of the tank B.

The expander D is charged with a volatile liquid of the nature previously stated, and when the pump G is set in motion a partial vacuum is created in the expander, causing the liquid to evaporate. The vapors thus produced pass through the expansion-coil F to the pump G, and they are forced out through the compression-coil H toward the tube I.

The stop-cock *i* is so placed that the vapors while passing through the coil H will be compressed or condensed into a liquid state, and a small jet of this condensed liquid escapes through the tube I into the expander D. On reaching the expander this condensed liquid is rapidly evaporated, and a large quantity of heat is abstracted from the liquid surrounding the expander D.

By continuing the operation of the pump G the temperature of the liquid in the tank B can be rapidly brought down below the freezing-point, and, if desired, several degrees below zero, and the temperature of the air in the chamber A is rapidly lowered by contact with the bottom and sides of the tank B, and also by the cooling effect of the coil *u*, through which the cold liquid from the tank is caused to circulate by the action of the pump L.

As the vapors of the volatile liquid are condensed in the compression-coil H the water in the condenser K becomes heated by contact with said coil; but this effect is counteracted by the cooling effect of the expansion-coil F. If the temperature of the water should increase, however, it can be readily lowered by the introduction of ice. For the purpose of producing ice for this and other purposes, I provide the tank B with traverses *r* for the support of cans M, which are filled with water. In a short time this water freezes and the requisite supply of ice is obtained. A suitable drip-pan, N, prevents the condensed water which forms on the bottom of the tank B from dripping down into the provision-chamber.

If my apparatus is to be used simply for the production of ice, the tank B can be placed in any convenient position, its sides being protected by a jacket of a suitable non-conductor of heat, so that the same are not influenced by the heat of the external atmosphere.

In applying my apparatus to an ordinary refrigerator it is essential that the pump shall be so constructed that it can be easily turned by hand, so that the temperature in the provision-chamber can be kept down by setting the pump in motion from time to time. A few strokes of the plunger produce the desired effect.

The pump which I use is of peculiar construction; but, since the same forms the subject of a separate application, I do not give the detailed description of the same in this specification.

I do not claim, broadly, as my invention the process of producing cold by the alternate expansion and condensation of a volatile liquid, such being old and well known.

There have heretofore been used ice-machines in which a volatile liquid is introduced to and withdrawn from an expansion-chamber by means of a double-acting pump, and such expansion-chamber has been immersed in a tank of water kept in circulation or flow.

There has also been used a machine in which a condensing-coil and expansion-coil for the volatile liquid have been immersed in the same tank of water, so that the heating effect of the one is counteracted by the cooling effect of the other.

Coils of pipe conducting a cold liquid have also been used for refrigerating chambers.

None of these features do I claim, broadly.

What I claim as new, and desire to secure by Letters Patent, is—

1. The combination, with the refrigerating chamber or box A, of the tank B, placed in the upper portion of said chamber, the coil *u u*, leading from said tank through said chamber, the pump L, pipe *s*, the vapor-expander D, located within the tank B, the double-acting pump, coil F, pipes *a b*, coil H, pipes *g h*, and the tank K, substantially as described, and for the purpose set forth.

2. The combination, with the refrigerating chamber or box A, of the tank B, coil *u u*, leading from the said tank through said chamber, the vapor-expander D, located within said tank, a combined exhaust and injection pump connected with said vapor-expander, a vapor-condenser connected with said exhaust and injection pump, and a combined liquid exhaust and supply mechanism connected with the tank B, substantially as described, and for the purpose set forth.

In testimony that I claim the foregoing I hereunto set my hand and seal this 23d day of August, 1878.

JOHN GEO. WOLF. [L. S.]

Witnesses:
W. HAUFF,
W. C. HAUFF.